United States Patent Office 2,720,460
Patented Oct. 11, 1955

2,720,460

PRODUCTION OF QUICK-COOKING RICE

Charles E. Flynn, East Paterson, and Frank Hollis, Jr., Weehawken, N. J., assignors to General Foods Corporation, New York, N. Y., a corporation of Delaware No Drawing. Application December 22, 1952, Serial No. 327,426

18 Claims. (Cl. 99—80)

This invention relates to a method of preparing a quick-cooking rice product.

Rice is usually prepared in the home by immersion in excess water and boiling. During such cooking the starch is gelatinized and the moisture content of the rice increases to about 60–80%, the grains swelling to several times their original size and becoming soft and palatable. In order to make sure that the starch in the centers of the grains is properly cooked, however, relatively long cooking is required with the result that the starch at the grain surfaces becomes overcooked and the starch granules burst and discharge a sticky, pasty liquid which is largely dissipated in the cooking water. Also the surfaces of the grains are pasty and unpalatable unless the remaining starch paste is washed off with a further loss of nutritive constituents. These losses may amount to as much as 25% by weight of the rice. Such undesirable surface overcooking may be avoided partially by shortening the cooking period, but only at the expense of leaving the centers of the grains undercooked, hard and chewy.

In the prior commercial production of quick-cooking rice, the grains have usually been precooked by immersion in excess water as described above. But it is virtually impossible to obtain in this way a product in which the texture of the individual grains is uniform from center to surface, at least without prohibitive cooking losses. When such products are reconstituted or rehydrated in the kitchen, this nonuniformity of texture is often objectionable from the standpoint of the consumer, whereas the manufacturer at best is handicapped by severe processing losses.

One of the objects of the present invention is to provide an improved process for the manufacture of quick-cooking rice whereby it is possible to obtain any desired texture or consistency in the rice as reconstituted or rehydrated for consumption.

Another object is to provide such an improved process which produces cooked rice grains of completely uniform texture not only throughout the individual grains but also throughout the mass.

A further object is to provide such an improved process wherein the cooking losses encountered in previously used methods are practically completely eliminated.

A still further object is to provide an improved process of producing quick-cooking rice in which the proportion of broken grains is greatly reduced as compared with prior practices.

Another object is to provide an improved quick-cooking rice which does not turn rancid when packaged and kept for long periods of time.

These and other objects and advantages of the invention will become apparent from the following description.

The present invention is predicated on the discovery that the disadvantages of immersion cooking as heretofore practiced can be avoided almost entirely by conducting the hydration of the rice in stages and at least partially gelatinizing the starch at an intermediate stage of hydration by heating the partially hydrated grains in the absence of excess water. Based on this discovery, the principal steps of a process embodying the present invention comprise heating partially hydrated rice in the absence of excess water so as to cause at least partialy gelatinization of the starch; then further hydrating the rice to increase its moisture content and to cause substantial enlargement of the rice grains, and at the same time heating to complete gelatinization if necessary; and then drying the rice to a stable moisture content under conditions such as to retain at least a substantial part of the enlargement of the wet grains and produce a porous dry structure.

In order that the heating step may result in uniform gelatinization of the starch throughout the partially hydrated rice grains, they should contain at least about 20% moisture. In some instances rough rich as harvested in the field may contain substantially this minimum amount, but the ordinary brown or white, raw or parboiled rice of commerce contains only about 8–14% moisture so that water must be added. In practice, therefore, it will generally be necessary to resort to washing or soaking to prepare the rice for heating and gelatinization, the rice being simply brought in contact with excess water in any desired manner and for a length of time sufficient to produce the desired increase in moisture level of the grains. Thorough washing is often sufficient to soak the rice to the minimum level of 20%. Preferably, however, the moisture level should be in the range of 25–35% (wet basis) and this is conveniently attained by soaking the rice to saturation at room temperature, requiring approximately 25–35 minutes. Continued soaking after saturation is reached produces no change in the rice unless accompanied by heating. In some cases moisture levels up to about 45% may be desired and may be reached by warming the rice while it is being soaked, but time and temperature of soaking must be limited to avoid substantial gelatinization which would be equivalent to a mild immersion cook having many of the disadvantages of the prior commercial practices mentioned above.

When at the desired moisture level, the rice is drained if necessary to remove excess water and then subjected to appropriate heat treatment in the absence of excess water to effect gelatinization. By way of example, suitable heating methods include steaming; heating by convection, as with a suitable gas; radiant heating, as with infra-red lamps; and dielectric heating. It is to be understood, of course, that any suitable measures known to the art may be taken to insure uniform heating of the individual grains, such as agitation or spreading the grains in layers. Wherever necessary, moreover, the humidity of the atmosphere should be regulated to prevent undue drying of the rice which might prevent the desired gelatinization. The temperature must be above about 160° F., the approximate gelatinization point for rice, but should be limited to avoid scorching. The duration of the heat treatment depends upon the temperature, the moisture content of the rice, and the degree of gelatinization that it is desired to obtain. The rice may be completely gelatinized in the heating operation if desired, but in most cases it is preferable to accomplish only partial gelatinization in which case gelatinization will be completed subsequently as described below.

Usually, the heating operation can be performed most conveniently and economically by steaming the soaked rice. While steam at atmospheric pressure can be employed, the use of steam under pressure is preferred because the higher temperature increases the rate of gelatinization and thus reduces the heating time. Good results are obtained at moderate pressures of the order of 10 lbs./sq. in. gauge. Under these conditions the preferred partial gelatinization of the grains can be accomplished in about 15 minutes or less. Longer time is required at atmospheric pressure.

When using steam for the heating operation the moisture content of the rice should not be permitted to increase more than about 8%. Under ordinary conditions it will be found that the moisture content increases no more than about 5% and this is the preferred mode of operation. As aforementioned, it is not important that the moisture content of the rice increase during the heating step, but, in fact, may even decrease slightly providing the moisture content of the rice remains at a level sufficient to permit the desired degree of gelatinization to take place.

After gelatinization, the rice is further hydrated to increase its moisture content to within the range of about 50-75% with consequent enlargement of the individual grains, greater degrees of enlargement of course being obtained as the moisture level is increased. The rice is brought into contact with water in any suitable manner. Spraying, tumbling, and like techniques may be employed, but simple soaking by immersion is preferred. If the rice has been substantially completely gelatinized in the heating step, the hydration or resoaking step may be carried out at any temperature ranging from one as low as 35° F. to one as high as 212° F. Hydration takes place much more quickly at higher temperatures of the order of 180° F. to boiling, however, for example, two similar samples required 60 minutes to reach 65% moisture at room temperature but only 15 minutes at 180° F. Such higher temperatures are also preferred in case the gelatinization obtained in the heating step is less than complete, in which event the resoak temperature must be above the gelatinzation temperature of the rice. In general, it is preferable in the interest of economy to curtail the heating step, and the use of such higher temperatures during hydration not only expedites hydration but also insures the completion of gelatinization in all cases.

Generally, the time required for the hydration step does not exceed 30 minutes. In cases where the rice has been completely gelatinized during heating and is hydrated at relatively low temperatures, say 100° F., a period of about 30 minutes is required to increase the moisture content to the preferred level of about 65-70%. Similar periods of time are required when less than complete gelatinization has been effected in the preceding heating step and temperatures above 160° F. are employed for the purposes of hydration and completion of the gelatinization. On the other hand, a period of time as short as 18 minutes is adequate in those cases where nearly complete gelatinization is effected during the heating step and the hydration is carried out at the higher temperatures, such as 200° F.

The resoaking step produces rice grains which at 50% moisture are about twice the size of the raw grains at their normal moisture level of 8-14%, and at 75% moisture are between three and four times as large as the raw grains. These resoaked swollen grains are then dried to a stable moisture content of the order of 10-14% in such a way as to retain at least a substantial part of their enlargement and produce a porous structure. Preferably this is accomplished by rapid drying such as disclosed in U. S. Patent No. 2,438,939, i. e., by removing the moisture from the surfaces of the grains at a rate sufficiently faster than it can diffuse to the surfaces from the interiors as to cause formation of a comparatively dry outer layer or shell on the grains while they are still wet and swollen. Thus the grains are set or fixed in an enlarged expanded condition and further drying causes internal shrinkage of the starch and results in the formation of a porous structure. Conventional drying equipment can be used for this purpose, such as a belt or tray dryer in conjunction with circulating gas of suitable temperature and humidity. Good results can be obtained by spreading the wet rice in a layer on a supporting screen and blowing relatively dry heated air downwardly through the bed. Air temperatures in excess of 300° F. should be avoided to prevent scorching.

As will be shown below, the steps thus far described produce a product having excellent properties with very little loss as compared to procedures heretofore used. It will be understood, however, that these steps may be supplemented by any other known techniques which may contribute to the overall efficacy of the process. For example, it is known that rapid heating of raw rice grains may cause the formation of fissures extending inwardly from their surfaces and facilitating the penetration of water, steam, and the like. Examples of such procedures are found in the copending applications of Shuman et al., Serial No. 219,524 and Campbell et al., Serial Nos. 219,513 and 219,514, all filed April 5, 1951, these applications respectively relating to the use of dielectric heating, convection heating, and radiant heating of raw rice grains. If the raw rice grains are so treated prior to the initial soaking step of the present process, then this soaking and the subsequent steaming can be materially facilitated.

Likewise if a very white product is desired, the soaking and resoaking water may be suitably acidified; a pH of 3.5 obtained by phosphoric acid additions is particularly successful. The use of iron-free water and of equipment made of stainless steel, glass, or the like also contributes to this result.

Again, before the resoaking step, the steamed rice can be "bumped" as disclosed in the copending application of Durrani, Serial No. 188,475, filed October 4, 1950. That is, the grains may be passed through rolls or otherwise treated to cause only slight compression which modifies their internal structure without greatly changing their external appearance and without reducing them to flake form. This bumping of the grains greatly facilitates their further hydration in the resoaking step and considerably reduces the time required to reach the desired moisture level.

Finally, the size of the enlarged dried grains can be still further increased by subjecting the grains to oven puffing as a supplement to the rapid drying described above. It is known that moist cereal grains will puff somewhat when subjected to moderate temperatures in an oven, even though the temperature is limited to avoid toasting or scorching of the grains. Thus the wet grains can be dried rapidly in the manner described above until their moisture content is reduced to a value somewhat less than 30% and then subjected to a brief oven puffing at 250-350° F. which completes the drying of the grains to the desired final moisture level and at the same time causes puffing and enlarges the grains materially beyond the size at which they are set by rapid drying. This has the advantage of increasing the porosity of the dried grains and thus facilitating their subsequent reconstitution for consumption, as well as providing a fluffier reconstituted product of greater volume.

The following detailed examples illustrate the practical use of the invention:

Example I 100 lbs. of milled rice were soaked in water at room temperature for 30 minutes, after which the moisture content of the grains was about 25% on the wet basis. After draining to remove excess water, the soaked rice was cooked for 45 minutes by passing saturated steam at atmospheric pressure upwardly through a bed thereof, the moisture content after steaming being about 30%. The rice was then resoaked by immersion in water at 100° F. for approximately 30 minutes, gentle agitation being employed to break up any clumps formed during cooking. After draining and rising, the resoaked rice had a moisture content of about 61% and the volume of the rice at this point had increased about 3½ times that of the starting raw rice.

The wet grains were spread in a layer on a screen and dried by forced air circulation, the layer being not more than one inch in depth to allow free passage of the drying air therethrough. The air inlet temperature was 285° F. and its velocity through the grains was about 500 feet per minute. Under these conditions the grains dried to about 11% moisture in 12 minutes, the dry volume of the sample being about 2.2 times the volume of the starting raw rice.

*Example II*

100 lbs. of milled rice were soaked in water at room temperature for 30 minutes, after which the moisture content of the grains was 30% on the wet basis. After draining to remove excess water, the rice was cooked with steam at 10 pounds pressure for five minutes, its moisture content being thereby increased to about 34%. After steaming, the rice was separated and the grains passed between flaking rolls set to compress the grains only slightly. The bumped rice grains were then immersed in water at 190° F. for five minutes to increase their moisture content to about 66% and the volume of the sample to about 3.8 times that of the starting raw rice. After draining, washing and drying in the manner set forth in Example I, the volume of the sample was about 2.5 times that of the starting raw rice.

*Example III*

100 lbs. of milled rice were soaked in water at room temperature for 30 minutes, after which the moisture content of the grains was 29% on the wet basis. After draining off excess water, the rice was cooked with steam at 10 pounds pressure for 15 minutes, its moisture content being increased to 35%. The steamed rice was then separated and immersed in water at 200° F. for 18 minutes, thereby increasing its moisture content to about 71% and the volume of the sample to about 3.9 times that of the starting raw rice. The resoaked rice was then drained, rinsed and dried in the manner set forth in Example I, the final volume of the dry sample being about 2.7 times that of the starting raw rice.

The dried products of all three of the above examples were substantially the same, apart from the variations in volume specified above. The individual grains resembled selected extra large rice grains in shape and general appearance. Their porous internal structure was readily apparent on breakage, but because of porosity the characteristic translucent glassy appearance of dried, gelatinized starch was entirely absent. The oil content of the dried products was below 0.25% at which point there is no difficulty with rancidity even though shelf life should be extended well beyond normal length.

The dried products were reconstituted or rehydrated quickly and easily by adding the amount of water desired in the final product, bringing the water to a boil and then removing the rice from the heat and allowing it to stand for 10 minutes. For example, the three specimens described above were rehydrated by adding 340 cc. of ordinary tap water to 142 g. of the dried rice to provide about 72% total moisture. The resulting products were ready to eat and had the appearance and taste of unusually large and fluffy expertly cooked rice. The volumes of the reconstituted 85 g. samples were 320 cc., 350 cc., and 350 cc., respectively. In texture, the grains were soft but not mushy, and uniform throughout with neither pasty surfaces nor hard centers.

The advantages of the invention reside not only in improved texture and other qualities of the product, but also in a very important reduction of processing losses. In immersion cooking, the principal method heretofore used in the production of quick-cooking rice, the outer starch of the grain becomes gelatinized in the presence of excess water and quickly hydrates and swells to form an outer layer which hinders the penetration of moisture and heat to the interior of the grain. Hence by the time the centers become cooked, even to a rather tough and chewy stage only, surface overcooking takes place with resulting losses as high as 15-25% of the total starch, and the surfaces of the grains are soft and pasty. If cooking is continued to soften the centers, the losses become prohibitive, the grains tend to split, and the product tends to dry as a mass rather than as individual separable grains.

In the present process, however, at least a large part of the gelatinization takes place in the heating step in the presence of a limited amount of moisture, whereas hydration to the final high moisture level is isolated in the resoaking step. Heating in the absence of excess or free water prevents complete hydration and bursting of the surface starch cells; even when wet steam is used, the grains should as aforementioned take up no more than about 5% of additional moisture during the heating step. At the same time, however, enough water is present to permit substantial or if desired complete gelatinization to take place uniformly throughout the entire grain. When such grains are resoaked, the desired additional amount of water can be absorbed at temperatures below the gelatinization point, or in a very short time at temperatures of the order of 180° F. or above.

Thus hydration and gelatinization are completed under very mild conditions. Losses of surface starch due to overcooking are practically eliminated, amounting to only 3% under good conditions. Moreover, the absence of surface stickiness facilitates drying and separation of the grains and minimizes breakage. From the standpoint of the consumer, on the other hand, the principal advantages of the invention reside in uniformity of texture from surface to center and from grain to grain, and in the fact that this uniformity can be achieved and maintained with either a soft-textured or a hard-textured product according to consumer preference.

It will be understood that the invention is not restricted to the details of the foregoing description nor to the examples particularly set forth therein and that reference should be had to the appended claims for a definition of its limits.

What is claimed is:

1. In a method of producing quick-cooking rice in which rice grains are substantially completely gelatinized and hydrated and then dried rapidly to retain at least part of the enlargement of the swollen grains, the improvement which comprises hydrating the rice grains in stages and at least partially gelatinizing the starch throughout the grains at an intermediate stage of hydration by heating the partially hydrated grains to gelatinizing temperature in the absence of excess water.

2. The method of claim 1 in which the rice is heated by steaming at a pressure of about 10 lbs./sq. in. (gauge).

3. The method of claim 2 in which the rice grains after being steamed are subjected to slight compression to modify their internal structure without reducing them to flakes before completing their hydration.

4. A method as defined in claim 1 wherein the rice grains are maintained above the gelatinization temperature during the final stage of hydration.

5. A method for preparing quick-cooking rice which comprises substantially completely gelatinizing the rice starch and hydrating the grains to a swollen, enlarged condition, and then drying the rice under conditions retaining at least part of the enlargement of the swollen grains, at least a substantial part of the gelatinization being effected by heating the rice grains to gelatinizing temperature at relatively low moisture content and in the absence of excess water and the remaining water of hydration being supplied to the grains after the heat treatment thereof.

6. A method for preparing quick-cooking rice as defined in claim 5, wherein the aforesaid heating of the grains is effected by steaming soaked rice grains in the absence of excess water.

7. A method as defined in claim 5, wherein the rice grains are substantially completely gelatinized in said heating step.

8. A method as defined in claim 5, wherein the rice grains are only partially gelatinized in said heating step, the remaining water of hydration being supplied at a temperature above the gelatinization temperature of the starch to complete gelatinization thereof.

9. The method of claim 5 in which the rice grains after being heated to at least partially gelatinize the same are subjected to slight compression to modify their internal structure without reducing them to flakes, and after further hydration are dried until their moisture content is reduced to below about 30%, after which said grains are subjected to a temperature within the range of about 250–350° F. to effect puffing without toasting.

10. A method for preparing a quick-cooking rice which comprises steaming soaked rice to partially gelatinize the starch, then soaking the rice in water at a temperature above about 160° F. to complete the gelatinization and hydration of the starch and to enlarge the grains, and drying the rice while maintaining at least partially the enlarged size of the grains.

11. A method for preparing a quick-cooking rice which comprises steaming soaked rice to substantially completely gelatinize the starch, then soaking the rice in water at a temperature below about 160° F. to further hydrate the starch and enlarge the grains, and drying the rice while maintaining at least partially the enlarged size of the grains.

12. A method for preparing a quick-cooking rice which comprises steaming soaked rice to substantially completely gelatinize the starch, then soaking the rice in water at a temperature above about 160° F. to further hydrate the starch and enlarge the grains, and drying the rice while maintaining at least partially the enlarged size of the grains.

13. A method for preparing a quick-cooking rice which comprises heating rice having a moisture content within the range of about 20–45% in the absence of excess water to at least partially gelatinize the starch, then contacting the rice with water at a temperature above about 160° F. to insure complete gelatinization of the starch and to increase its moisture content to within the range of about 50–75% and enlarge the grains, and drying the rice while maintaining at least partially the enlarged size of the grains.

14. A method for preparing a quick-cooking rice which comprises steaming rice having a moisture content within the range of about 20–45% to at least partially gelatinize the starch, then contacting the rice with water at a temperature above about 160° F. to insure complete gelatinization of the starch and to increase its moisture content to within the range of about 50–75% and enlarge the grains, and drying the rice while maintaining at least partially the enlarged size of the grains.

15. A method for preparing a quick-cooking rice which comprises steaming rice having a moisture content within the range of about 25–35% to substantially completely gelatinize the same, said steam being at a pressure of about 10 lbs./sq. in. (gauge), subjecting the rice grains to slight compression to modify their internal structure without reducing them to flakes, soaking the rice in water to increase the moisture content of the starch to within the range of about 60–70% and to enlarge the grains, and drying the rice while maintaining at least partially the enlarged size of the grains.

16. The method of claim 15 in which the final drying is carried out at temperatures sufficiently high to cause oven-puffing while avoiding toasting.

17. A method for preparing a quick-cooking rice which comprises steaming rice having a moisture content within the range of about 25–35% to partially gelatinize the starch, said steam being at a pressure of about 10 lbs./sq. in. (gauge), subjecting the steamed grains to slight compression to modify their internal structure without reducing them to flakes, soaking the rice in water at a temperature above about 160° F. to insure complete gelatinization of the starch and to increase its moisture content to within the range of about 60–70% and enlarge the grains, and drying the rice while maintaining at least partially the enlarged size of the grains.

18. The method of claim 17 in which said drying is continued until the moisture content of the rice grains is reduced to below about 30% after which said grains are subjected to a temperature of within the range of about 250–350° F. to effect puffing without toasting.

References Cited in the file of this patent

UNITED STATES PATENTS

| | | |
|---|---|---|
| 1,239,555 | Baumgartner | Sept. 11, 1917 |
| 2,438,939 | Ozai-Durrani | Apr. 6, 1948 |
| 2,546,456 | Landon et al. | Mar. 27, 1951 |

FOREIGN PATENTS

| | | |
|---|---|---|
| 657,691 | Great Britain | Sept. 26, 1951 |